(12) United States Patent
Aggarwal et al.

(10) Patent No.: US 11,677,921 B2
(45) Date of Patent: Jun. 13, 2023

(54) SYSTEM AND METHOD FOR GENERATING DEWARPED IMAGE USING PROJECTION PATTERNS CAPTURED FROM OMNI-DIRECTIONAL STEREO CAMERAS

(71) Applicant: DREAMVU INC, Philadelphia, PA (US)

(72) Inventors: Rajat Aggarwal, Iudhiana (IN); Anoop M Namboodiri, Kothamangalam (IN); Parikshit Sakurikar, Hyderabad (IN)

(73) Assignee: DREAMVU INC., Philadelphia, PA (US)

( * ) Notice: Subject to any disclaimer, the term of this patent is extended or adjusted under 35 U.S.C. 154(b) by 0 days.

(21) Appl. No.: 17/567,140

(22) Filed: Jan. 2, 2022

(65) Prior Publication Data
US 2022/0217315 A1  Jul. 7, 2022

(30) Foreign Application Priority Data
Jan. 2, 2021 (IN) .............................. 202141000084

(51) Int. Cl.
*H04N 13/122* (2018.01)
*H04N 5/247* (2006.01)
(Continued)

(52) U.S. Cl.
CPC ........... *H04N 13/122* (2018.05); *G03B 35/08* (2013.01); *G06T 3/0012* (2013.01); *G06T 5/006* (2013.01);
(Continued)

(58) Field of Classification Search
CPC .... H04N 13/122; H04N 5/247; H04N 9/3188; H04N 13/243; H04N 13/296; H04N 13/324; H04N 13/363; H04N 2013/0077; H04N 2013/0096; H04N 5/23238; G03B 35/08; G03B 35/10; G03B 2206/00; G06T 3/0012; G06T 5/006; G06T 2200/04;
(Continued)

(56) References Cited

U.S. PATENT DOCUMENTS

| | | | |
|---|---|---|---|
| 2012/0026605 A1* | 2/2012 | Kato | H04N 13/243 359/698 |
| 2012/0257022 A1* | 10/2012 | Suto | H04N 13/239 348/47 |

(Continued)

*Primary Examiner* — Tung T Vo

(57) ABSTRACT

A system for generating high-resolution de-warped omni-directional stereo image from captured omni-directional stereo image by correcting optical distortions using projection patterns is provided. The system includes a projection pattern capturing arrangement, a projector or a display, and a de-warping server. The projection pattern capturing arrangement includes one or more omnidirectional cameras to capture projection patterns from the captured omni-directional stereo image from each omni-directional stereo camera. The projector or the display displays the projection patterns. The de-warping server obtain the projection patterns and processes the projection patterns to generate high resolution de-warped omni-directional stereo image by correcting optical distortions in the captured omni-directional stereo image and mapping the captured omni-directional stereo image and the high resolution de-warped omni-directional stereo image.

19 Claims, 6 Drawing Sheets

(51) Int. Cl.

| | |
|---|---|
| *H04N 13/243* | (2018.01) |
| *H04N 13/363* | (2018.01) |
| *H04N 13/296* | (2018.01) |
| *G06T 5/00* | (2006.01) |
| *H04N 9/31* | (2006.01) |
| *H04N 13/324* | (2018.01) |
| *G03B 35/08* | (2021.01) |
| *G06T 3/00* | (2006.01) |
| *H04N 13/00* | (2018.01) |

(52) U.S. Cl.
CPC ........... *H04N 5/247* (2013.01); *H04N 9/3188* (2013.01); *H04N 13/243* (2018.05); *H04N 13/296* (2018.05); *H04N 13/324* (2018.05); *H04N 13/363* (2018.05); *G06T 2200/04* (2013.01); *G06T 2207/10012* (2013.01); *G06T 2207/10024* (2013.01); *G06T 2207/20068* (2013.01); *H04N 2013/0077* (2013.01); *H04N 2013/0096* (2013.01)

(58) Field of Classification Search
CPC . G06T 2207/10012; G06T 2207/10024; G06T 2207/20068
USPC .......................................................... 348/47
See application file for complete search history.

(56) References Cited

U.S. PATENT DOCUMENTS

| | | | | |
|---|---|---|---|---|
| 2015/0381972 | A1* | 12/2015 | Kowdle | G06T 7/593 |
| | | | | 348/51 |
| 2018/0324399 | A1* | 11/2018 | Spears | H04N 13/232 |
| 2018/0338123 | A1* | 11/2018 | Moule | H04N 9/3185 |
| 2019/0188871 | A1* | 6/2019 | Fletcher | H04N 13/111 |
| 2020/0033118 | A1* | 1/2020 | Nguyen | G06T 17/20 |
| 2020/0099920 | A1* | 3/2020 | Khamis | G06T 7/90 |
| 2021/0134053 | A1* | 5/2021 | Ingram | G06T 7/593 |
| 2021/0152810 | A1* | 5/2021 | Jensen | G06T 7/521 |
| 2021/0358157 | A1* | 11/2021 | Ohnishi | G01B 11/245 |
| 2022/0103797 | A1* | 3/2022 | Barbour | G06V 10/10 |

\* cited by examiner

CONFIGURING A PROJECTION PATTERN CAPTURING ARRANGEMENT THAT INCLUDES ONE OR MORE OMNI-DIRECTIONAL STEREO CAMERAS TO CAPTURE AT LEAST ONE CAPTURED OMNI-DIRECTIONAL STEREO IMAGE FROM EACH OMNI-DIRECTIONAL STEREO IMAGE AND CAPTURING ONE OR MORE PROJECTION PATTERNS FROM THE ONE OR MORE OMNI-DIRECTIONAL STEREO CAMERAS BY ADJUSTING DIMENSIONAL DETAILS OF A PROJECTOR OR A DISPLAY WITH ONE OR MORE ORIENTATIONS OF THE ONE OR MORE OMNI-DIRECTIONAL STEREO CAMERAS ⎯ 402

CONFIGURING THE PROJECTOR OR THE DISPLAY TO DISPLAY THE ONE OR MORE PROJECTION PATTERNS THAT ARE OBTAINED FROM THE PROJECTION PATTERN CAPTURING ARRANGEMENT, THE PROJECTOR OR THE DISPLAY IS PLACED AT A DISTANCE OF FROM THE PROJECTION PATTERN CAPTURING ARRANGEMENT TO COVER THE REQUIRED FIELD OF VIEW FOR THE AT LEAST ONE CAPTURED OMNI-DIRECTIONAL STEREO IMAGE BOTH HORIZONTALLY AND VERTICALLY ⎯ 404

CONFIGURING DE-WARPING SERVER TO OBTAIN ONE OR MORE PROJECTION PATTERNS THAT ARE DISPLAYED ON THE PROJECTOR OR THE DISPLAY AND PROCESS THE ONE OR MORE PROJECTION PATTERNS ⎯ 406

MODIFYING A COUNT OF ONE OR MORE PROJECTION PATTERNS TO MATCH WITH THE RESOLUTION OF THE ONE OR MORE OMNI-DIRECTIONAL STEREO CAMERAS ⎯ 408

FIG. 4A

SYSTEM AND METHOD FOR GENERATING DEWARPED IMAGE USING PROJECTION PATTERNS CAPTURED FROM OMNI-DIRECTIONAL STEREO CAMERAS

CROSS-REFERENCE TO PRIOR-FILED PATENT APPLICATIONS

This application claims priority from the Indian provisional application no. 202141000084 filed on Jan. 2, 2021, which is herein incorporated by reference.

TECHNICAL FIELD

The embodiments herein generally relate to image processing, and more particularly, to a system and method for generating high-resolution de-warped omni-directional stereo image from captured omni-directional stereo image by correcting optical distortions using projection patterns.

DESCRIPTION OF THE RELATED ART

In this digital era, the technology in cameras has developed exponentially. In photography, an omnidirectional camera is a camera that covers an entire sphere in a horizontal plane. That is, the omnidirectional stereo camera captures the whole spherical view of the required field of view i.e., 360 degrees in each of its axes within its field of view. The existing conventional omnidirectional stereo camera systems include a sensor for each lens to capture an image within the desired field of view. By including a sensor for each lens, the conventional omnidirectional stereo camera systems cannot capture a spherical or 360 degree view of the desired field of view without any distortions. To reduce these distortions, if any image processing methods used are applied to these distorted images may affect the quality and resolution of the image adversely.

In some existing systems, a mirror arrangement is placed in front of the lens in the omnidirectional camera system to capture the spherical or 360-degree image. With this kind of arrangement, an incomplete image by cutting out the top and bottom parts of the desired field of view is obtained. Eventually, the raw images of any omnidirectional stereo cameras need further image processing to obtain a better resolution and better quality. The raw images obtained from the omnidirectional camera system are not comprehensible to the human eyes.

Therefore, there arises a need to address the aforementioned technical drawbacks in existing technologies to de-warp an image obtained from the omni-directional camera system.

SUMMARY in view of the foregoing, an embodiment herein provides an image de-warping system generating at least one high-resolution de-warped omni-directional stereo image from at least one captured omni-directional stereo image by correcting optical distortions using projection patterns. The system includes a projection pattern capturing arrangement. The projection pattern capturing arrangement includes one or more omnidirectional stereo cameras. The projection pattern capturing arrangement is configured to capture at least one captured omni-directional stereo image from each omni-directional stereo camera by obtaining a required field of view for the at least one captured omni-directional stereo image and captures one or more projection patterns from the one or more omni-directional stereo cameras by adjusting dimensional details of a projector or a display with one or more orientations of the one or more omni-directional stereo cameras. The system includes the projector or the display that is configured to display the one or more projection patterns that are obtained from the projection pattern capturing arrangement. The projector or the display is placed at a distance from the projection pattern capturing arrangement to cover the required field of view for the at least one captured omni-directional stereo image both horizontally and vertically. The system includes a de-warping server that is configured to obtain one or more projection patterns that are displayed on the projector or the display and processes the one or more projection patterns. The de-warping server includes a memory module that stores a database and a set of instructions, and a processor that is configured to execute a set of instructions and modules and is configured to (i) modify a count of the plurality of projection patterns to match with the resolution of the one or more omni-directional stereo cameras; (ii) acquire, from the one or more omni-directional stereo cameras, the one or more projection patterns based on the count of the one or more projection patterns; (iii) determine a structured projection pattern by synchronizing, using a sequential project and capture synchronization technique, the plurality of projection patterns from the projector or the display sequentially within a delta error; and, (iv) generate, using an image processing method, at least one high resolution de-warped omni-directional stereo image from the structured projection pattern by correcting optical distortions in the at least one captured omni-directional stereo image by mapping the at least one captured omni-directional stereo image and the at least one high resolution de-warped omni-directional stereo image.

In some embodiments, an order and the count of the one or more projection patterns depends on the resolution of the one or more omni-directional stereo cameras.

In some embodiments, the one or more projection patterns includes at least one of a binary two-dimensional horizontal and vertical pattern, a bit-code representation of two-dimensional horizontal and vertical patterns, scan-line representation of two-dimensional horizontal and vertical patterns or phase correlated two-dimensional horizontal and vertical patterns, the one or more projection patterns are in at least one of grayscale or color.

In some embodiments, the dimensional details of the projector or the display and the one or more projection patterns include the plurality of orientations of each omni-directional stereo camera, the one or more orientations include mounting features, rotational features and translation features for each omni-directional stereo camera and display/projection.

In some embodiments, the one or more omni-directional stereo cameras are placed at least one of upright or inverted orientation inside the projection pattern capturing arrangement.

In some embodiments, the one or more omni-directional stereo cameras include at least one of a single optical reflector or multiple optical reflectors to gather light from a full 360 degrees field of view onto a single sensor in a stereoscopic manner. The reflectors are mounted on a plane or at different planes. The reflectors are oriented in one or more directions with respect to each other.

In some embodiments, the projection pattern capturing arrangement is placed in at least one of a dark or semi-dark environments to avoid ghost-lighting.

In some embodiments, the projector or the display is at least one of a rear projector or a front projector, or a display, the projector or the display is at least one of an omni-directional display or a set of n number of individual displays, each display/projection from the set of n number of individual displays covers the field of view of $2\pi/n$, where n is a number of rotations performed by the one or more omni-stereo cameras to cover 360 degrees, the projector or the display projects the at least one captured omni-directional stereo image in at least one of orthographic, perspective, cylindrical or spherical manner, the projector includes at least one of infrared spectrum projection or visible spectrum projection.

In some embodiments, the delta error to determine the structured projection pattern is 0.1 seconds.

In some embodiments, the one or more omni-directional stereo cameras include at least one of a single optical reflector or one or more optical reflectors to gather light from a full 360 field of view onto a single sensor in a stereoscopic manner, the one or more reflectors are mounted on a plane or at different planes, the one or more reflectors are oriented in one or more directions with respect to each other.

In one aspect, one or more non-transitory computer-readable storage medium store the one or more sequence of instructions, which when executed by a processor, further causes a method a method for generating at least one high-resolution de-warped omni-directional stereo image from at least one captured omni-directional stereo image by correcting optical distortions using projection patterns is provided. The method includes configuring a projection pattern capturing arrangement that includes one or more omni-directional stereo cameras to capture at least one captured omni-directional stereo image from each omni-directional stereo camera by obtaining a required field of view for the at least one captured omni-directional stereo image and capturing one or more projection patterns from the one or more omni-directional stereo cameras by adjusting dimensional details of a projector or a display with one or more orientations of the one or more omni-directional stereo cameras to capture one or more projection patterns from the one or more omni-directional stereo cameras. The method includes configuring a projector or the display to display the one or more projection patterns that are obtained from the projection pattern capturing arrangement, the projector or the display is placed at a distance from the projection pattern capturing arrangement to cover the required field of view for the at least one captured omni-directional stereo image both horizontally and vertically. The method includes configuring a de-warping server to obtain the plurality of projection patterns that are displayed on the projector and process the one or more projection patterns to generate at least one high-resolution omni-directional stereo image by correcting optical distortions in the at least one captured de-warped omni-directional stereo image by, (i) modifying a count of the one or more projection patterns to match with the resolution of the one or more omni-directional stereo cameras; (ii) acquiring, from the one or more omni-directional stereo cameras, the one or more projection patterns based on the count of the one or more projection patterns; (iii) determining a structured projection pattern by synchronizing, using a sequential project and capture synchronization technique, the one or more projection patterns from the projector or the display sequentially within a delta error; and, (iv) generating, using an image processing method, at least one high resolution de-warped omni-directional stereo image from the structured projection pattern by correcting optical distortions in the at least one captured omni-directional stereo image by mapping the at least one captured omni-directional stereo image and the at least one high resolution de-warped omni-directional stereo image.

In another aspect, a method for generating at least one high-resolution de-warped omni-directional stereo image from at least one captured omni-directional stereo image by correcting optical distortions using projection patterns is provided. The method includes configuring a projection pattern capturing arrangement that includes one or more omni-directional stereo cameras to capture at least one captured omni-directional stereo image from each omni-directional stereo camera by obtaining a required field of view for the at least one captured omni-directional stereo image and capturing one or more projection patterns from the one or more omni-directional stereo cameras by adjusting dimensional details of a projector or a display with one or more orientations of the one or more omni-directional stereo cameras to capture one or more projection patterns from the one or more omni-directional stereo cameras. The method includes configuring a projector or the display to display the one or more projection patterns that are obtained from the projection pattern capturing arrangement, the projector or the display is placed at a distance from the projection pattern capturing arrangement to cover the required field of view for the at least one captured omni-directional stereo image both horizontally and vertically. The method includes configuring a de-warping server to obtain the plurality of projection patterns that are displayed on the projector and process the one or more projection patterns to generate at least one high-resolution omni-directional stereo image by correcting optical distortions in the at least one captured de-warped omni-directional stereo image by. (i) modifying a count of the one or more projection patterns to match with the resolution of the one or more omni-directional stereo cameras; (ii) acquiring, from the one or more omni-directional stereo cameras, the one or more projection patterns based on the count of the one or more projection patterns; (iii) determining a structured projection pattern by synchronizing, using a sequential project and capture synchronization technique, the one or more projection patterns from the projector or the display sequentially within a delta error; and, (iv) generating, using an image processing method, at least one high resolution de-warped omni-directional stereo image from the structured projection pattern by correcting optical distortions in the at least one captured omni-directional stereo image by mapping the at least one captured omni-directional stereo image and the at least one high resolution de-warped omni-directional stereo image.

In some embodiments, an order and the count of the one or more projection patterns depends on the resolution of the one or more omni-directional stereo cameras.

In some embodiments, the one or more projection patterns includes at least one of a binary two-dimensional horizontal and vertical pattern, a bit-code representation of two-dimensional horizontal and vertical patterns, scan-line representation of two-dimensional horizontal and vertical patterns or phase correlated two-dimensional horizontal and vertical patterns, the one or more projection patterns are in at least one of grayscale or color.

In some embodiments, the dimensional details of the projector or the display and the one or more projection patterns include the plurality of orientations of each omni-directional stereo camera, the one or more orientations include mounting features, rotational features and translation features for each omni-directional stereo camera and display/projection.

In some embodiments, the one or more omni-directional stereo cameras are placed at least one of upright or inverted orientation inside the projection pattern capturing arrangement.

In some embodiments, the one or more omni-directional stereo cameras include at least one of a single optical reflector or multiple optical reflectors to gather light from a full 360 degrees field of view onto a single sensor in a stereoscopic manner. The reflectors are mounted on a plane or at different planes. The reflectors are oriented in one or more directions with respect to each other.

In some embodiments, the projection pattern capturing arrangement is placed in at least one of a dark or semi-dark environments to avoid ghost-lighting.

In some embodiments, the projector or the display is at least one of a rear projector or a front projector, or a display, the projector or the display is at least one of an omnidirectional display or a set of n number of individual displays, each display/projection from the set of n number of individual displays covers the field of view of 2π/n, where n is a number of rotations performed by the one or more omni-stereo cameras to cover 360 degrees, the projector or the display projects the at least one captured omni-directional stereo image in at least one of orthographic, perspective, cylindrical or spherical manner, the projector includes at least one of infrared spectrum projection or visible spectrum projection.

In some embodiments, the delta error to determine the structured projection pattern is 0.1 seconds.

In some embodiments, the one or more omni-directional stereo cameras include at least one of a single optical reflector or one or more optical reflectors to gather light from a full 360 field of view onto a single sensor in a stereoscopic manner, the one or more reflectors are mounted on a plane or at different planes, the one or more reflectors are oriented in one or more directions with respect to each other.

The system and method are used for correcting the distortions produced while using a single sensor-based omnidirectional stereo camera. The system or method helps in processing the image projections without compromising their quality and resolutions. Also, the calibration of complex imaging systems is performed in less time. Hence time efficiency in calibration is improved. The resolution in converting a two-dimensional image to a 360-degree three-dimensional stereo image is maximum. The hardware setup can be used for shooting any of, but not limited to, alive or filming or music videos at low cost. The system or method can be installed as security cameras where ever it is required without costing as much as the omnidirectional stereo cameras with multiple sensors and processors.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 4A-4B are flow diagrams that illustrate a method for generating at least one high-resolution de-warped omni-directional stereo image from at least one captured omni-directional stereo image by correcting optical distortions using projection patterns, according to some embodiments herein.

DETAILED DESCRIPTION OF THE DRAWINGS

Figure 1:
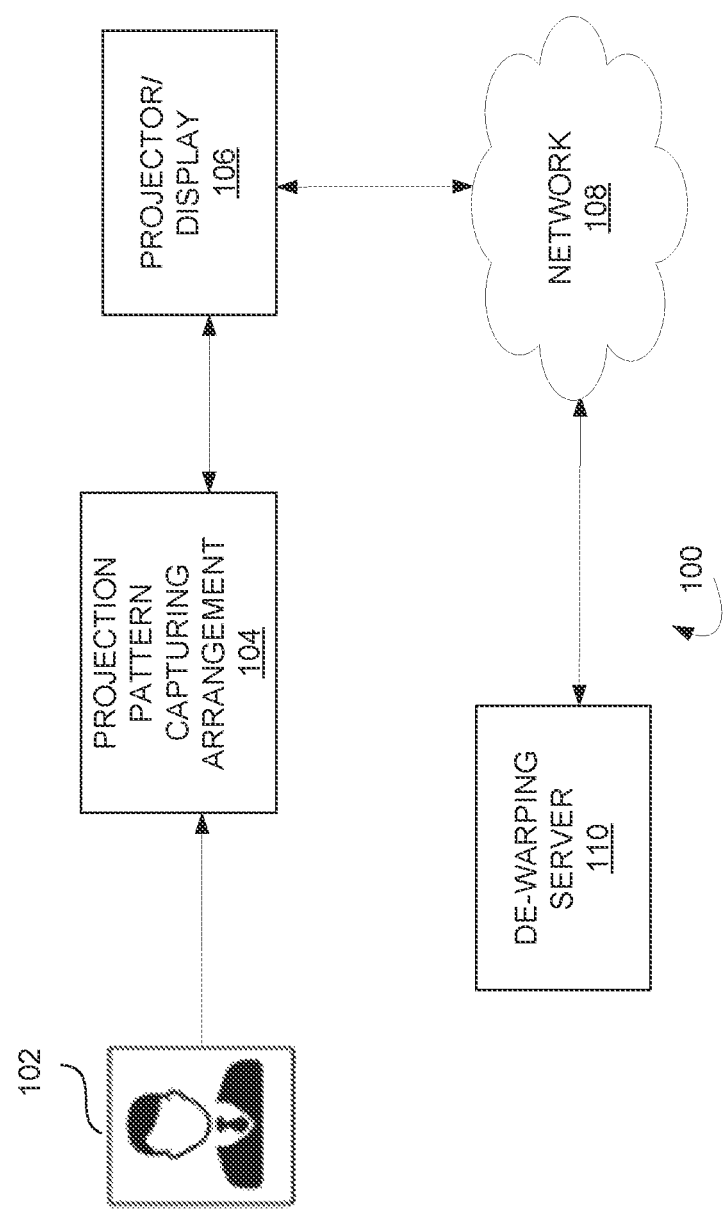
FIG. 1 illustrates a system for generating at least one high-resolution de-warped omni-directional stereo image from at least one captured omni-directional stereo image by correcting optical distortions using projection patterns, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system and method for generating high-resolution de-warped omni-directional stereo image from captured omni-directional stereo image by correcting optical distortions using projection patterns. Refereeing now to the drawing, and more particularly to FIG. 1 through FIG. 5, where similar reference characters denote corresponding features consistently throughout the figures, preferred embodiments are shown.

FIG. 1 illustrates a system 100 for generating at least one high-resolution de-warped omni-directional stereo image from at least one captured omni-directional stereo image by correcting optical distortions using projection patterns, according to some embodiments herein. The system 100 includes a user 102, a projection pattern capturing arrangement 104, a projector or a display 106, and a de-warping server 110. The projection pattern capturing arrangement 104 includes one or more omnidirectional stereo cameras. The one or more omnidirectional stereo cameras may include a 360-degree field of view. In some embodiments, the one or more omni-directional stereo cameras include at least one of a single optical reflector or multiple optical reflectors to gather light from a full 360 degrees field of view onto a single sensor in a stereoscopic manner. The reflectors are mounted on a plane or at different planes. The reflectors are oriented in one or more directions with respect to each other. The user 102. mounts the one or more omnidirectional stereo cameras and customizes calibration of the one or more omnidirectional stereo cameras based on a required field of view. The user 102 adjusts dimensional details of an orientation of the one or more omnidirectional stereo cameras and the projection pattern arrangement 104 to cover the required field of view. In some embodiments, the calibration of the one or more omnidirectional stereo cameras that are customized by the user 102 may include but are not limited to, a combination of a plurality of techniques of mounting, rotating, and translating the one or more omnidirectional stereo cameras, the dimensional details of the projector or the display 106. The projection pattern capturing arrangement 104 covers the required field of view. The projection pattern capturing arrangement 104 may include an inverted arrangement and multiple arrangements. The inverted arrangement may include another camera, similar to the one or more omni-directional stereo cameras that are installed inversely inside the projection pattern capturing arrangement 104. The multiple arrangements may include one or more setups as a single arrangement in the projection pattern capturing arrangement 104 to improve the required field of view. The projection pattern capturing arrangement 104 is placed in such a way that a height and a width of the projection screen of the projector or the display 106 and a distance between the projector or the display 106 and the one or more omnidirectional stereo cameras are well adjusted to cover the field of view both horizontally and vertically. In some embodiments, an orientation of the omni-directional stereo camera may include but are not limited to, rotation, translation, and mounting features. The projector or the display 106 may allow coverage of a plurality of facets of the one or more omnidirectional stereo cameras. In some embodiments, the projector or the display 106 is not affected by specular or ghost-lighting in case of lighting adjustments. The projection pattern capturing arrangement 104 may be placed in a dark or semi-dark environment.

The projection pattern capturing arrangement 104 is configured to capture at least one captured omni-directional stereo image from each omni-directional stereo camera. The projection pattern capturing arrangement 104 captures one or more projection patterns from the one or more omni-directional stereo cameras by adjusting dimensional details of a projector or a display 106 with one or more orientations of the one or more omni-directional stereo cameras.

The projector or the display 106 is configured to display the one or more projection patterns that are obtained from the projection pattern capturing arrangement 104. In some embodiments, the projector or the display 106 is at least one of a rear projector or a front projector, or a display to capture the one or more projection patterns. The projector or the display 106 is at least one of an omni-directional display or a set of n number of individual displays. Each display/projection from the set of n number of individual displays covers the field of view of 2π/n, where n is a number of rotations performed by the one or more omni-stereo cameras to cover 360 degrees. The projector or the display 106 may project in at least one of orthographic, perspective, cylindrical or spherical manner. The projector or the display 106 includes at least one of infrared spectrum projection or visible spectrum projection.

The projection pattern capturing arrangement 104 enables synchronization of the one or more projection patterns and the orientation of the one or more omnidirectional stereo cameras with the projection pattern capturing arrangement 104. The de-warping server 110 obtains the one or more projection patterns that are displayed on the projector or the display 106 through a network 108 and processes the one or more projection patterns. In some embodiments, the network 108 may be a wireless network, a wired network, a combination of a wired network or a wireless network, or Internet.

In some embodiments, the one or more projection patterns includes at least one of a binary two-dimensional horizontal and vertical pattern, a bit-code representation of two-dimensional horizontal and vertical patterns, scan-line representation of two-dimensional horizontal and vertical patterns or phase correlated two-dimensional horizontal and vertical patterns. In some embodiments the projection patterns are in at least one of grayscale or color.

The projector or the display 106 displays the one or more projection patterns at a resolution that matches the resolution of the one or more omnidirectional cameras. The one or more projection patterns depends on the resolution of the one or more omnidirectional cameras. The de-warping server 110 modifies a count of the one or more projection patterns to match with the resolution of the one or more omni-directional stereo cameras. In some embodiments, an order and the count of the one or more projection patterns depends on the resolution of the one or more omni-directional stereo cameras. The de-warping server 110 acquires the one or more projection patterns based on the count of the one or more projection patterns from the one or more omni-directional stereo cameras. The de-warping server 110 determines a structured projection pattern by synchronizing one or more projection patterns from the projector or the display sequentially within a delta error using a sequential project and capture synchronization technique. In some embodiments, the delta error to determine the structured projection pattern is 0.1 seconds. The de-warping server 110 generates at least one high resolution de-warped omnidirectional stereo image from the structured projection pattern by correcting optical distortions in the at least one captured omni-directional stereo image by mapping the at least one captured omni-directional stereo image and the at least one high resolution de-warped omni-directional stereo image using an image processing method.

Figure 2:
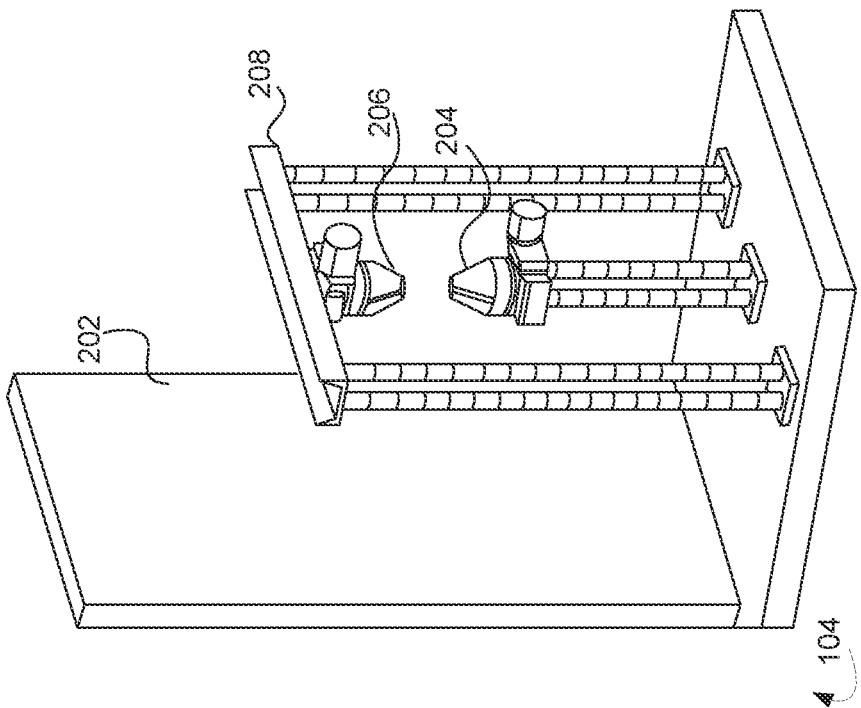
FIG. 2 is an exemplary illustration of the projection pattern capturing arrangement of FIG. 1, according to some embodiments herein.
Figure 2:
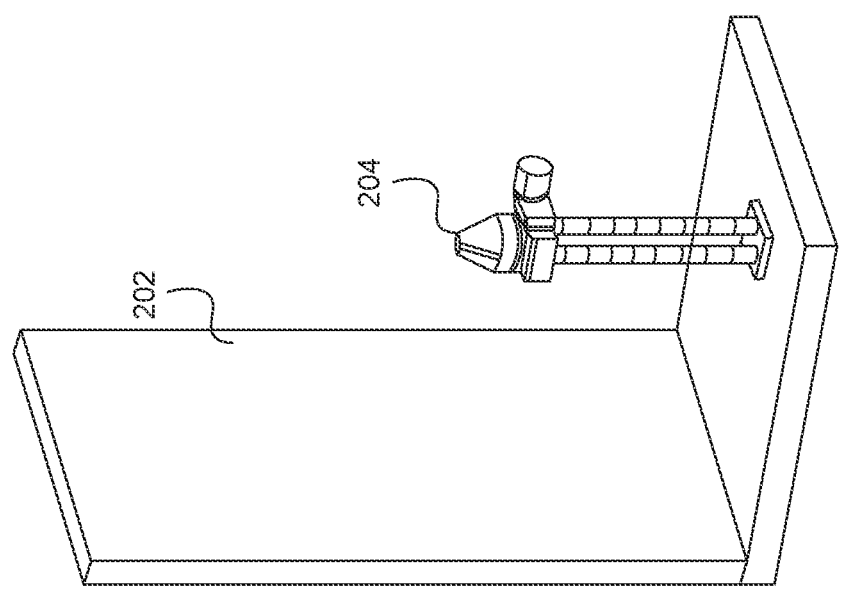

FIG. 2 is an exemplary illustration of the projection pattern capturing arrangement 104 of FIG. 1. The exemplary illustration of the projection pattern capturing arrangement 104 includes a projection screen 202, an omnidirectional stereo camera 204, an inverted arrangement 206, a multiple arrangement 208. The user 102 adjusts the dimensional details of an orientation of the omnidirectional stereo camera 204 and the projection pattern arrangement 104 to cover a required field of view. In some embodiments, the calibration of the one or more omnidirectional stereo cameras that are customized by the user 102 may include, but not limited to, a combination of a plurality of techniques in mounting, rotating, and translating the omnidirectional stereo camera 204. The projection pattern capturing arrangement 104 covers the required field of view. The omnidirectional stereo camera 204 is placed upright or inversely inside the projection pattern capturing arrangement 104, and the inverted arrangement 206 or any multiple arrangements that may be installed in multiple arrangements 208 as a setup in the projection pattern capturing arrangement 104 as a single setup to improve the field of view. The projection pattern capturing arrangement 104 ensures that a height and a width of the projection screen 202 of the projection system 106 and a distance between the projection screen and the omnidirectional stereo camera 204 are well adjusted to cover the field of view both horizontally and vertically. In some embodiments, the orientation of the omnidirectional stereo camera 204 may include but are not limited to, rotation, translation, and mounting features. The projector or the display 106 allows coverage of a plurality of facets of the omnidirectional stereo camera 204. In some embodiments, the projector or the display 106 may not be affected by a specular or a ghost-lighting, the projection pattern capturing arrangement 104 may be placed in a dark or semi-dark environment in case of lighting adjustments. The projection system 106 captures one or more projection patterns using the projection pattern capturing arrangement 104. In some embodiments, the projector or the 106 may be a rear projector or a front projector, or a display to capture the one or more projection patterns. In some embodiments, the projector or the display 106 is at least one of a rear projector or a front projector, or a display. The projector or the display 106 is at least one of an omni-directional display or a set of n number of individual displays, each display/projection covers the field of view of 2π/n, where n is a number of rotations performed by the one or more omni-stereo cameras to cover 360 degrees. The projector or the display 106 may project in at least one of orthographic, perspective, cylindrical or spherical manner. The projector or the display 106 includes at least one of infrared spectrum projection or visible spectrum projection. The projection pattern capturing arrangement 104 enables synchronization of the one or more the projection patterns and orientation of the omnidirectional stereo camera with the projection pattern capturing arrangement 104.

Figure 3:
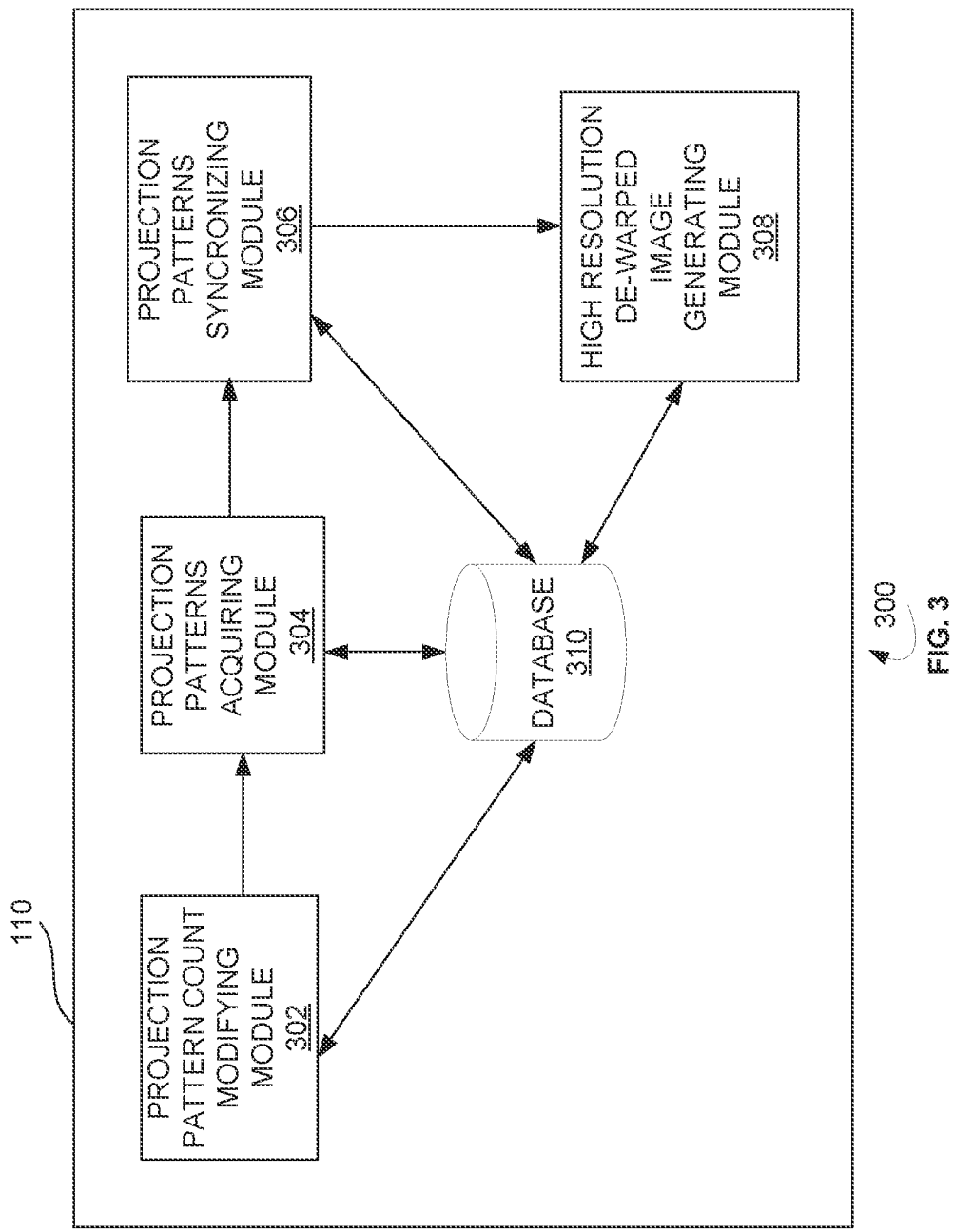
FIG. 3 is a block diagram of a de-warping server of FIG. 1, according to some embodiments herein.

FIG. 3 is a block diagram 300 of a de-warping server 110 of FIG. 1, according to some embodiments herein. The block diagram 300 of the de-warping server 110 includes a projection pattern count modifying module 302, a projection patterns acquiring module 304, a projection patterns synchronizing module 306, a high-resolution de-warped image generating module 308 and a database 310. The de-warping server 110 obtains one or more projection patterns that are displayed on the projector or the display 106 and processes the one or more projection patterns. In some embodiments, the one or more the projection patterns include at least one of a binary two-dimensional (2D) horizontal and vertical pattern; or a bit-code representation of 2D horizontal and vertical patterns; or a scan-line 2D horizontal and vertical patterns. In some embodiments, the one or more the projection patterns include at least one of a binary two-dimensional (2D) horizontal and vertical pattern; or a bit-code representation of 2D horizontal and vertical patterns, scan-line representation of two-dimensional horizontal and vertical patterns or phase correlated two-dimensional horizontal and vertical patterns. In some embodiments the projection patterns are in at least one of a grayscale or color. In some embodiments, the one or more projection patterns depends on the resolution of the one or more omni-directional cameras. The projection pattern count modifying module 302 modifies a count of the one or more projection patterns to match with the resolution of the one or more omni-directional stereo cameras. In some embodiments, an order and the count of the one or more projection patterns depends on the resolution of the one or more omni-directional stereo cameras. The projection patterns acquiring module 304 acquires the one or more projection patterns based on the count of the one or more projection patterns from the one or more omni-directional stereo cameras. The projection patterns synchronizing module synchronizes the one or more projection patterns from the projector or the display 106 sequentially within a delta error to determine a structured projection pattern using a sequential project and capture synchronization technique. In some embodiments, the delta error maybe, but not limited to 0.1 s. The high-resolution de-warped image generating module 308 generates at least one high resolution de-warped omni-directional stereo image from the structured projection pattern by correcting optical distortions in the at least one captured omni-directional stereo image by mapping the at least one captured omni-directional stereo image and the at least one high resolution de-warped omni-directional stereo image using an image processing method. The high-resolution de-warped image generating module 308 displays the high resolution de-warped omni-directional stereo image to the user 102 associated with a user device and the image is stored in the database 310.

Figure 4B:
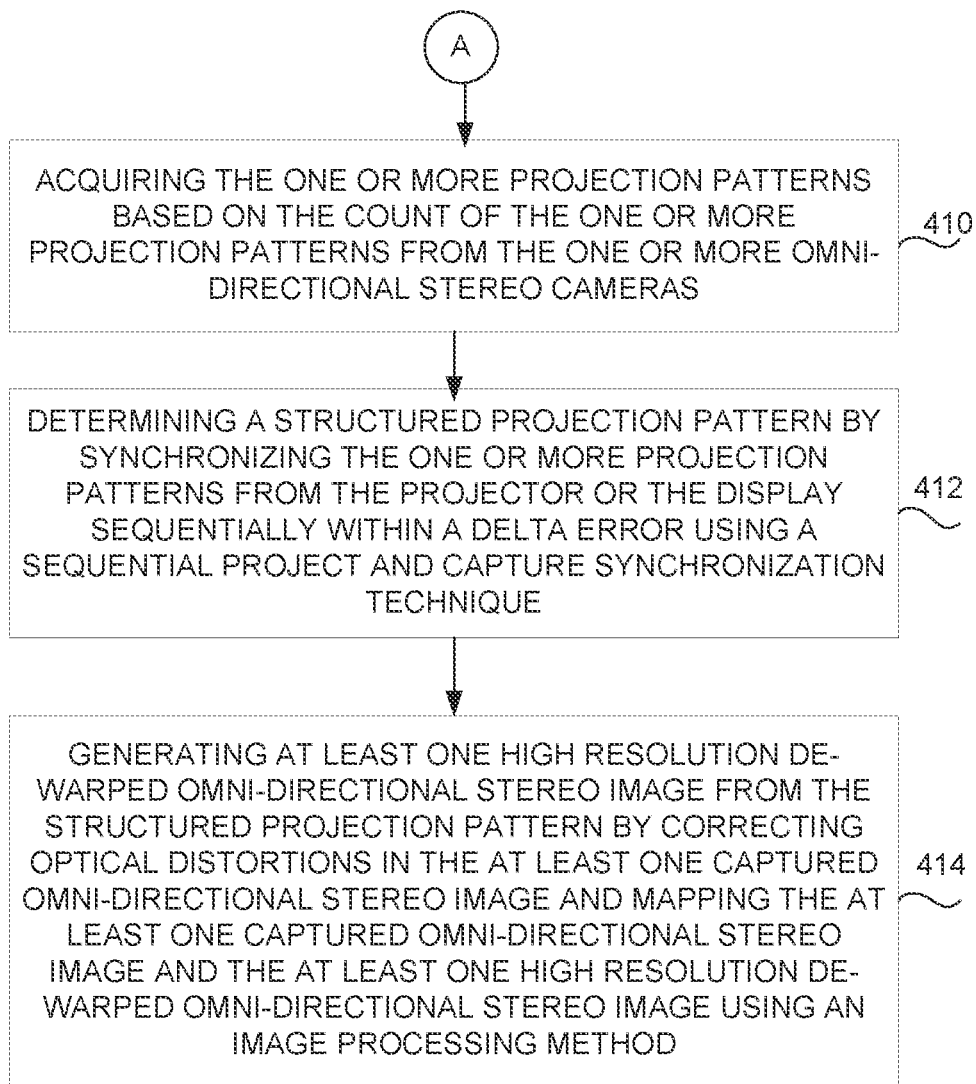

FIGS. 4A-4B are flow diagrams that illustrate a method for generating at least one high-resolution de-warped omni-directional stereo image from at least one captured omni-directional stereo image by correcting optical distortions using projection patterns, according to some embodiments herein. At 402, the method includes configuring a projection pattern capturing arrangement that includes one or more omni-directional stereo cameras to capture at least one captured omni-directional stereo image from each omni-directional stereo camera by obtaining a required field of view for the at least one captured omni-directional stereo image and capturing one or more projection patterns from the one or more omni-directional stereo cameras by adjusting dimensional details of a projector or a display with one or more orientations of the one or more omni-directional stereo cameras. At 404, the method includes configuring the projector or the display to display the one or more projection patterns that are obtained from the projection pattern capturing arrangement, the projector or the display is placed at a distance from the projection pattern capturing arrangement to cover the required field of view for the at least one captured omni-directional stereo image both horizontally and vertically. At 406, the method includes configuring a de-warping server to obtain the one or more projection patterns that are displayed on the projector and process the one or more projection patterns. At 408, the method includes modifying a count of the one or more projection patterns to match with the resolution of the one or more omni-directional stereo cameras. At 410, the method includes acquiring the one or more projection patterns based on the count of the one or more projection patterns from the one or more omni-directional stereo cameras. At 412, the method includes determining a structured projection pattern by synchronizing the one or more projection patterns from the projector or the display sequentially within a delta error using a sequential project and capture synchronization technique. At 414, the method includes generating at least one high resolution de-warped omni-directional stereo image from the structured projection pattern by correcting optical distortions in the at least one captured omni-directional stereo image by mapping the at least one captured omni-directional stereo image and the at least one high resolution de-warped omni-directional stereo image using an image processing method.

In an exemplary embodiment, the omni-directional stereo cameras of the projection pattern capturing arrangement are calibrated based on the required field of view of the input image. The omni-directional stereo cameras capture images sequentially at a time period and are projected on a projector or a display to obtain projection patterns. The projection patterns are used to generate a high-resolution omni-directional stereo image by correcting optical distortions using an image processing method.

Figure 5:
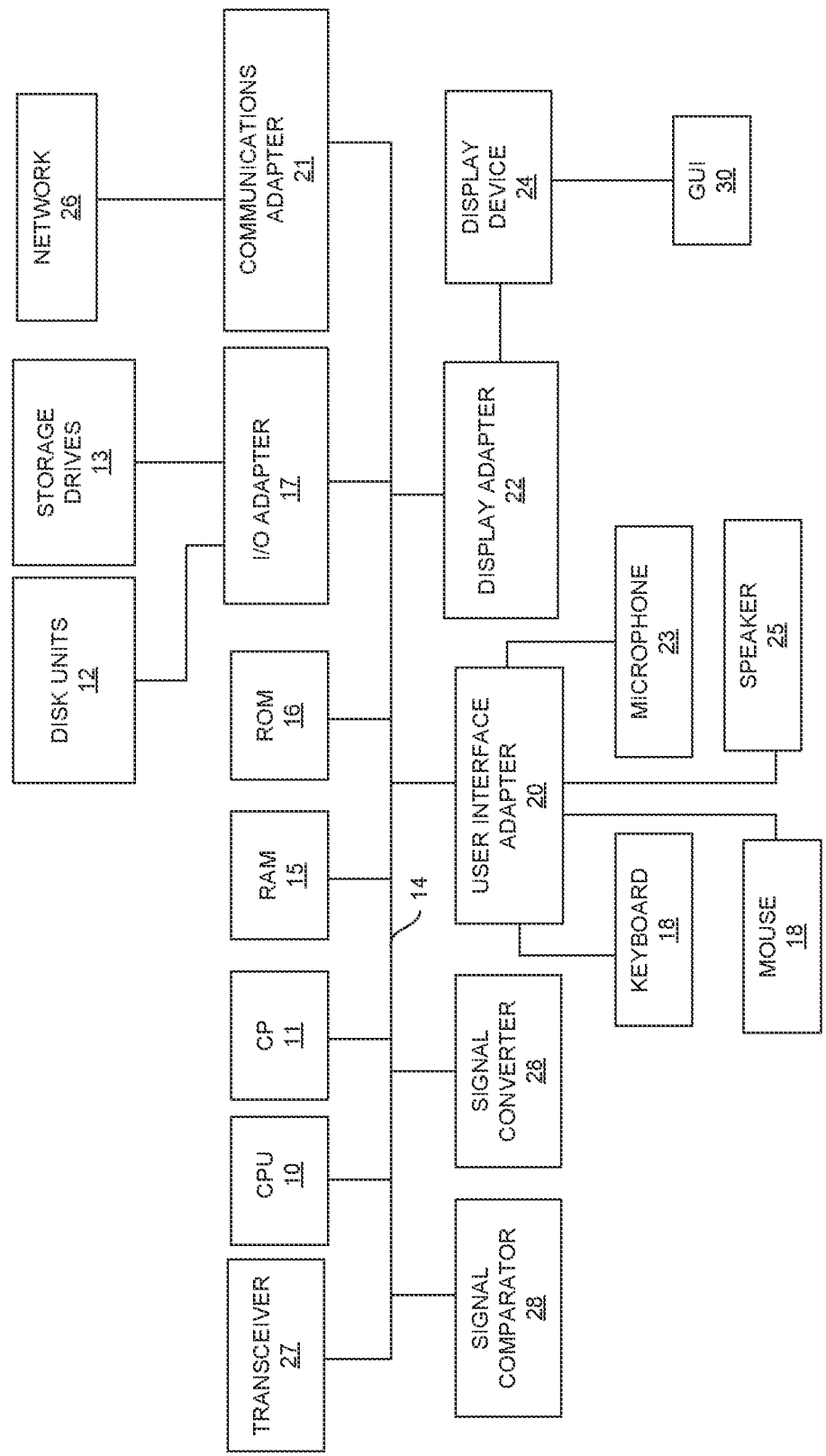
FIG. 5 is a schematic diagram of a computer architecture in accordance with the embodiments herein.

A representative hardware environment for practicing the embodiments herein is depicted in FIG. 5, with reference to FIGS. 1 through 4A-4B. This schematic drawing illustrates a hardware configuration of a de-warping server 110/computer system/computing device in accordance with the embodiments herein. The system includes at least one processing device CPU 10 that may be interconnected via system bus 14 to various devices such as a random-access memory (RAM) 12, read-only memory (ROM) 17, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An image de-warping system for generating at least one high-resolution de-warped omni-directional stereo image from at least one captured omni-directional stereo image by correcting optical distortions using projection patterns, the image de-warping system comprising:
    a projection pattern capturing arrangement that comprises a plurality of onmi-directional stereo cameras, wherein the projection pattern capturing arrangement is configured to capture at least one captured omni-directional stereo image from each omni-directional stereo camera by obtaining a required field of view for the at least one captured omni-directional stereo image and captures a plurality of projection patterns from the plurality of omni-directional stereo cameras by adjusting dimensional details of a projector or a display with a plurality of orientations of the plurality of omni-directional stereo cameras;
    the projector or the display that is configured to display the plurality of projection patterns that are obtained from the projection pattern capturing arrangement wherein the projector or the display is placed at a distance from the projection pattern capturing arrangement to cover the required field of view for the at least one captured omni-directional stereo image both horizontally and vertically;
    a de-warping server that is configured to obtain the plurality of projection patterns that are displayed on the projector or the display and processes the plurality of projection patterns, wherein the de-warping server comprises:
        a memory module that stores a database;
        a processor that is configured to execute modules and is configured to, characterized in that,
            modify a count of the plurality of projection patterns to match with a resolution of the plurality of omni-directional stereo cameras;
            acquire, from the plurality of omni-directional stereo cameras, the plurality of projection patterns based on the count of the plurality of projection patterns;
            determine a structured projection pattern by synchronizing, using a sequential project and capture synchronization technique, the plurality of projection patterns from the projector or the display sequentially within a delta error; and
            generate, using an image processing method, at least one high resolution de-warped omni-directional stereo image from the structured projection pattern by correcting optical distortions in the at least one captured omni-directional stereo image and mapping the at least one captured omni-directional stereo image and the at least one high resolution de-warped omni-directional stereo image.

2. The image de-warping system of claim 1, wherein an order and the count of the plurality of projection patterns depends on the resolution of the plurality of omni-directional stereo cameras.

3. The image de-warping system of claim 1, wherein the plurality of projection patterns comprises at least one of a binary two-dimensional horizontal and vertical pattern, a bit-code representation of two-dimensional horizontal and vertical patterns, scan-line representation of two-dimensional horizontal and vertical patterns or phase correlated two-dimensional horizontal and vertical patterns, wherein the plurality of projection patterns are in at least one of grayscale or color.

4. The image de-warping system of claim 1, wherein the dimensional details of the projector or the display and the plurality of projection patterns comprise the plurality of orientations of each omni-directional stereo camera, wherein the plurality of orientations comprises mounting features, rotational features and translation features for each omni-directional stereo camera and display or projection.

5. The image de-warping system of claim 1, wherein the plurality of omni-directional stereo cameras are placed at least one of upright or inverted orientation inside the projection pattern capturing arrangement.

6. The image de-warping system of claim 1, wherein the projection pattern capturing arrangement is placed in at least one of a dark or semi-dark environment to avoid ghost-lighting.

7. The image de-warping system of claim 1, wherein the projector or the display is at least one of a rear projector or a front projector, or a display, wherein the projector or the display is at least one of an omni-directional display or a set of n number of individual displays, wherein each display/projection from the set of n number of individual displays covers the field of view of $2\pi/n$ where n is a number of rotations performed by the one or more omni-stereo cameras to cover 360 degrees, wherein the projector or the display projects the at least one captured omni-directional stereo image in at least one of orthographic, perspective, cylindrical or spherical manner, wherein the projector comprises at least one of infrared spectrum projection or visible spectrum projection.

8. The image de-warping system of claim 1, wherein the delta error to determine the structured projection pattern is 0.1 seconds.

9. The image de-warping system of claim 1, wherein the plurality of omni-directional stereo cameras comprise at least one of a single optical reflector or one or more optical reflectors to gather light from a full 360 field of view onto a single sensor in a stereoscopic manner, wherein the one or more reflectors are mounted on a plane or at different planes, wherein the one or more reflectors are oriented in one or more directions with respect to each other.

10. A method for generating at least one high-resolution de-warped omni-directional stereo image from at least one captured omni-directional stereo image by correcting optical distortions using projection patterns, the method comprising,
configuring a projection pattern capturing arrangement that comprises a plurality of omni-directional stereo cameras to capture at least one captured omni-directional stereo image omni-directional stereo camera by obtaining a required field of view for the at least one captured omni-directional stereo image and capturing a plurality of projection patterns from the plurality of omni-directional stereo cameras by adjusting dimensional details of a projector or a display with a plurality of orientations of the plurality of omni-directional stereo cameras;
configuring the projector or the display to display the plurality of projection patterns that are obtained from the projection pattern capturing arrangement, wherein the projector or the display is placed at a distance from the projection pattern capturing arrangement to cover the required field of view for the at least one captured omni-directional stereo image both horizontally and vertically;
configuring a de-warping server to obtain the plurality of projection patterns that are displayed on the projector, and process the plurality of projection patterns to generate at least one high-resolution omni-directional stereo image by correcting optical distortions in the at least one captured de-warped omni-directional stereo image by,
modifying a count of the plurality of projection patterns to match with a resolution of the plurality of omni-directional stereo cameras;
acquiring, from the plurality of omni-directional stereo cameras, the plurality of projection patterns based on the count of the plurality of projection patterns;
determining a structured projection pattern by synchronizing, using a sequential project and capture synchronization technique, the plurality of projection patterns from the projector or the display sequentially within a delta error; and
generating, using an image processing method, at least one high resolution de-warped omni-directional stereo image from the structured projection pattern by correcting optical distortions in the at least one captured omni-directional stereo image and mapping the at least one captured omni-directional stereo image and the at least one high resolution de-warped omni-directional stereo image.

11. One or more non-transitory computer-readable storage medium storing the one or more sequence of instructions, which when executed by the one or more processors, causes to perform a method of generating at least one high-resolution de-warped omni-directional stereo image from at least one captured omni-directional stereo image by correcting optical distortions using projection patterns, the method comprising,
configuring a projection pattern capturing arrangement that comprises a plurality of omni-directional stereo cameras to capture at least one captured omni-directional stereo image omni-directional stereo camera by obtaining a required field of view for the at least one captured omni-directional stereo image and capturing a plurality of projection patterns from the plurality of omni-directional stereo cameras by adjusting dimensional details of a projector or a display with a plurality of orientations of the plurality of omni-directional stereo cameras;
configuring the projector or the display to display the plurality of projection patterns that are obtained from the projection pattern capturing arrangement, wherein the projector or the display is placed at a distance from the projection pattern capturing arrangement to cover the required field of view for the at least one captured omni-directional stereo image both horizontally and vertically;
configuring a de-warping server to obtain the plurality of projection patterns that are displayed on the projector, and process the plurality of projection patterns to generate at least one high-resolution omni-directional stereo image by correcting optical distortions in the at least one captured de-warped omni-directional stereo image by,
modifying a count of the plurality of projection patterns to match with a resolution of the plurality of omni-directional stereo cameras;
acquiring, from the plurality of omni-directional stereo cameras, the plurality of projection patterns based on the count of the plurality of projection patterns;
determining a structured projection pattern by synchronizing, using a sequential project and capture synchronization technique, the plurality of projection patterns from the projector or the display sequentially within a delta error; and
generating, using an image processing method, at least one high resolution de-warped omni-directional stereo image from the structured projection pattern by correcting optical distortions in the at least one captured omni-directional stereo image and mapping the at least one captured omni-directional stereo image and the at least one high resolution de-warped omni-directional stereo image.

12. The method of claim 10, wherein an order and the count of the plurality of projection pattern depends on the resolution of the plurality of omni-directional stereo cameras.

13. The method of claim 10, wherein the plurality of projection patterns comprises at least one of a binary two-dimensional horizontal and vertical pattern, a bit-code representation of two-dimensional horizontal and vertical patterns, scan-line representation of two-dimensional horizontal and vertical patterns or phase correlated two-dimensional horizontal and vertical patterns, wherein the plurality of projection patterns are in at least one of grayscale or color.

14. The method of claim 10, wherein the dimensional details of the projector or the display and the plurality of projection patterns comprise the plurality of orientations of each omni-directional stereo camera, wherein the plurality of orientations comprises mounting features, rotational features and translation features for each omni-directional stereo camera and display or projection.

15. The method of claim 10, wherein the plurality of omni-directional stereo cameras are placed at least one of upright or inverted orientation inside the projection pattern capturing arrangement.

16. The method of claim 10, wherein the projection pattern capturing arrangement is placed in at least one of a dark or semi-dark environment to avoid ghost-lighting.

17. The method of claim 10, wherein the projector or the display is at least one of a rear projector or a front projector, or a display, wherein the projector or the display is at least one of an omni-directional display or a set of n number of individual displays, wherein each display/projection from the set of n number of individual displays covers the field of view of 2π/n, where n is a number of rotations performed by the one or more omni-stereo cameras to cover 360 degrees, wherein the projector or the display projects the at least one captured omni-directional stereo image in at least one of orthographic, perspective, cylindrical or spherical manner, wherein the projector comprises at least one of infrared spectrum projection or visible spectrum projection.

18. The method of claim 10, wherein the delta error to determine the structured projection pattern is 0.1 seconds.

19. The method of claim 10, wherein the plurality of omni-directional stereo cameras comprise at least one of a single optical reflector or one or more optical reflectors to gather light from a full 360 field of view onto a single sensor in a stereoscopic manner, wherein the one or more reflectors are mounted on a plane or at different planes, wherein the one or more reflectors are oriented in one or more directions with respect to each other.

* * * * *